US010073966B2

(12) United States Patent
Oberg et al.

(10) Patent No.: US 10,073,966 B2
(45) Date of Patent: Sep. 11, 2018

(54) OPERATING SYSTEM-INDEPENDENT INTEGRITY VERIFICATION

(71) Applicant: SRI International, Menlo Park, CA (US)

(72) Inventors: Scott Oberg, Paso Robles, CA (US); Christopher S. Lockett, Santa Clara, CA (US); Sean Forsberg, San Luis Obispo, CA (US); Hassen Saidi, Menlo Park, CA (US); Jeffrey E. Casper, San Carlos, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 13/872,865

(22) Filed: Apr. 29, 2013

(65) Prior Publication Data

US 2014/0325644 A1    Oct. 30, 2014

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/51 | (2013.01) |
| G06F 21/57 | (2013.01) |

(52) U.S. Cl.
CPC .............. *G06F 21/51* (2013.01); *G06F 21/57* (2013.01)

(58) Field of Classification Search
USPC ............................ 726/22–25; 713/1–2, 187
See application file for complete search history.

(56) References Cited

U.S. PATENT DOCUMENTS

| 6,625,730 | B1* | 9/2003 | Angelo ................. G06F 9/4401 |
| | | | 713/1 |
| 7,222,062 | B2* | 5/2007 | Goud et al. ................... 713/189 |
| 7,962,738 | B2* | 6/2011 | Zimmer et al. .................. 713/2 |
| 8,151,262 | B2* | 4/2012 | Challener et al. ............... 718/1 |
| 8,276,201 | B2* | 9/2012 | Schunter et al. .............. 726/22 |
| 8,519,820 | B2 | 8/2013 | Cannistraro |
| 8,566,606 | B2* | 10/2013 | Movva et al. ................ 713/187 |
| 8,613,387 | B1* | 12/2013 | Billett ..................... G06F 21/57 |
| | | | 235/379 |
| 8,689,007 | B2* | 4/2014 | Schunter et al. ............. 713/189 |
| 8,782,435 | B1* | 7/2014 | Ghose ................... G06F 9/3851 |
| | | | 711/118 |
| 9,218,491 | B2* | 12/2015 | Wang .................... G06F 21/445 |
| 9,274,974 | B1* | 3/2016 | Chen .................... G06F 12/109 |

(Continued)

OTHER PUBLICATIONS

Cryptography—Lecture 19—Digital Signature Algorithms Lawrie Brown Feb. 8, 2001.*

(Continued)

*Primary Examiner* — Morshed Mehedi
*Assistant Examiner* — Vadim Savenkov
(74) *Attorney, Agent, or Firm* — Hickman Palermo Becker Bingham LLP

(57) ABSTRACT

An integrity verification subsystem can verify the integrity of software and firmware modules on a computing device at load time and/or at run time, independently of any operating systems that may be installed on the computing device. Some versions of the integrity verification subsystem can operate in physical and/or virtualized system environments, including virtualized mobile device architectures.

20 Claims, 6 Drawing Sheets

(56) References Cited

U.S. PATENT DOCUMENTS

| | | | | |
|---|---|---|---|---|
| 2005/0132122 | A1* | 6/2005 | Rozas | G06F 21/52 711/100 |
| 2005/0210467 | A1* | 9/2005 | Zimmer | G06F 21/53 718/1 |
| 2006/0047955 | A1* | 3/2006 | Prevost | G06F 21/54 713/165 |
| 2007/0005992 | A1* | 1/2007 | Schluessler et al. | 713/193 |
| 2007/0016766 | A1* | 1/2007 | Richmond | G06F 21/57 713/100 |
| 2007/0088857 | A1* | 4/2007 | Schluessler | G06F 21/53 710/8 |
| 2007/0226493 | A1* | 9/2007 | O'Brien | G06F 21/572 713/166 |
| 2008/0126779 | A1* | 5/2008 | Smith | 713/2 |
| 2008/0244114 | A1* | 10/2008 | Schluessler | G06F 13/28 710/24 |
| 2009/0049510 | A1* | 2/2009 | Zhang et al. | 726/1 |
| 2009/0089579 | A1* | 4/2009 | Murase | G06F 21/575 713/164 |
| 2009/0119748 | A1* | 5/2009 | Yao | G06F 21/57 726/2 |
| 2009/0265756 | A1* | 10/2009 | Zhang | G06F 21/53 726/1 |
| 2010/0169667 | A1* | 7/2010 | Dewan | G06F 21/10 713/193 |
| 2010/0169967 | A1* | 7/2010 | Khosravi et al. | 726/22 |
| 2012/0110174 | A1* | 5/2012 | Wootton | G06F 21/564 709/224 |
| 2014/0095886 | A1* | 4/2014 | Futral | G06F 21/572 713/187 |
| 2014/0223416 | A1* | 8/2014 | Cohen | G06F 8/73 717/123 |
| 2014/0298420 | A1* | 10/2014 | Barton | H04L 63/10 726/4 |

OTHER PUBLICATIONS

SRI International, "SRI International Begins Final Development of Commercial Trusted Mobility Devices for U.S. Marine Corps," available at http://www.sri.com/newsroom/press-releases/sri-begins-final-development-commercial-trusted-mobility-devices.

Carl L. Nerup et al., "A High Assurance Framework for Mobile/Wireless Device Applications," 2012, 15 pages, available at http://www.ok-labs.com/_assets/OK-WP-High-Assurance-Framework-022712.pdf.

Rob McCammon, "SecureIT Mobile: How to Build a More Secure Smartphone with Mobile Virtualization and Other Commercial Off-the-Shelf Technology," 2010, 14 pages.

Grit Denker et al., "Policy-Based Data Downgrading: Toward a Semantic Framework and Automated Tools to Balance Need-To-Protect and Need-To-Share Policies," IEEE International Symposium on Policies for Distributed Systems and Networks, Jun. 17, 2010, 9 pages.

Common Criteria for Information Technology Security Evaluation, "Part 1: Introduction and General Model," v. 3.1, rev. 3, Jul. 2009, 93 pages, available at http://www.commoncriteriaportal.org/files/ccfiles/CCPART1V3.1R3.pdf.

Common Criteria for Information Technology Security Evaluation, "Part 2: Security Functional Components," v. 3.1, rev. 3, Jul. 2009, 321 pages, available at http://www.commoncriteriaportal.org/files/ccfiles/CCPART2V3.1R3.pdf.

Common Criteria for Information Technology Security Evaluation, "Part 3: Security Assurance Components," v. 3.1, rev. 3, Jul. 2009, 232 pages, available at http://www.commoncriteriaportal.org/files/ccfiles/CCPART3V3.1R3.pdf.

J. M. Rushby et al., "The MILS Component Integration Approach to Secure Information Sharing," Proceedings of the 27th IEEE/AIAA Digital Avionics Systems Conference, 2008, St. Paul, MN, USA.

National Information Assurance Partnership: Common Criteria Evaluation & Validation Scheme, "U.S. Government Protection Profile for Separation Kernels in Environments Requiring High Robustness," v. 1.03, Jun. 29, 2007, 182 pages, available at http://www.niap-ccevs.org/pp/pp_skpp_hr_v1.03.pdf.

Rance Delong et al., "Toward a Medium-Robustness Separation Kernel Protection Profile," 2007, 10 pages, available at http://www.acsac.org/2007/papers/168.pdf.

Jonathan Corbet, "dm-verity", Rhino Security Labs, 2011.

Dmitry Kasatkin, "[dm-devel] [Patch 0/1] dm-integrity: Integrity Protection Device-Mapper Target", http://www.redhat.com/archives/dm-devel/2012-September/msg00320.html.

TrustZone, ARM the Architecture for the Digital World; http://www.arm.com/products/processors/technologies/trustzone.php.

Trustonic; Trusted Execution Environment, http://www.trustonic.com/products-services/trusted-execution-environment.

Open Kernel Labs, OKL4 Microvisor : Open Kernel Labs, http://www.ok-labs.com/products/okl4-microvisor.

* cited by examiner

OPERATING SYSTEM-INDEPENDENT INTEGRITY VERIFICATION

BACKGROUND

Traditional system architectures for mobile computing devices, such as smart phones, tablet computers, and the like, have a monolithic, vertical design in which execution of the file systems, device drivers, and software stacks is controlled by the operating system kernel. A security issue raised by a software application running on the device can therefore impact the entire system. As a consequence, it can be challenging to reliably and consistently maintain the security of the mobile device execution environment. The potential security risks posed by the downloading of third-party software to mobile devices are well-documented, and have spawned a "mobile device management" industry.

Mobile device management systems and other mobile device security mechanisms typically perform integrity checks only at installation time or only with the involvement of the operating system. Among other things, these solutions fail to protect against sideloading, bootloader jailbreaking, and run-time exploitation techniques that attempt to gain elevated (e.g., root-level) privileges in the operating system that is the target of the security attack.

Virtualization technology has long been a component of data center and desktop computing. Efforts are being made to apply virtualization technology to mobile devices. Proponents of mobile device virtualization believe that the technology can accelerate the development and deployment of new mobile device software at a lower cost. Whether a mobile device (or any type of computing device, for that matter) has a traditional or a virtualized architecture, security and integrity verification issues exist.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
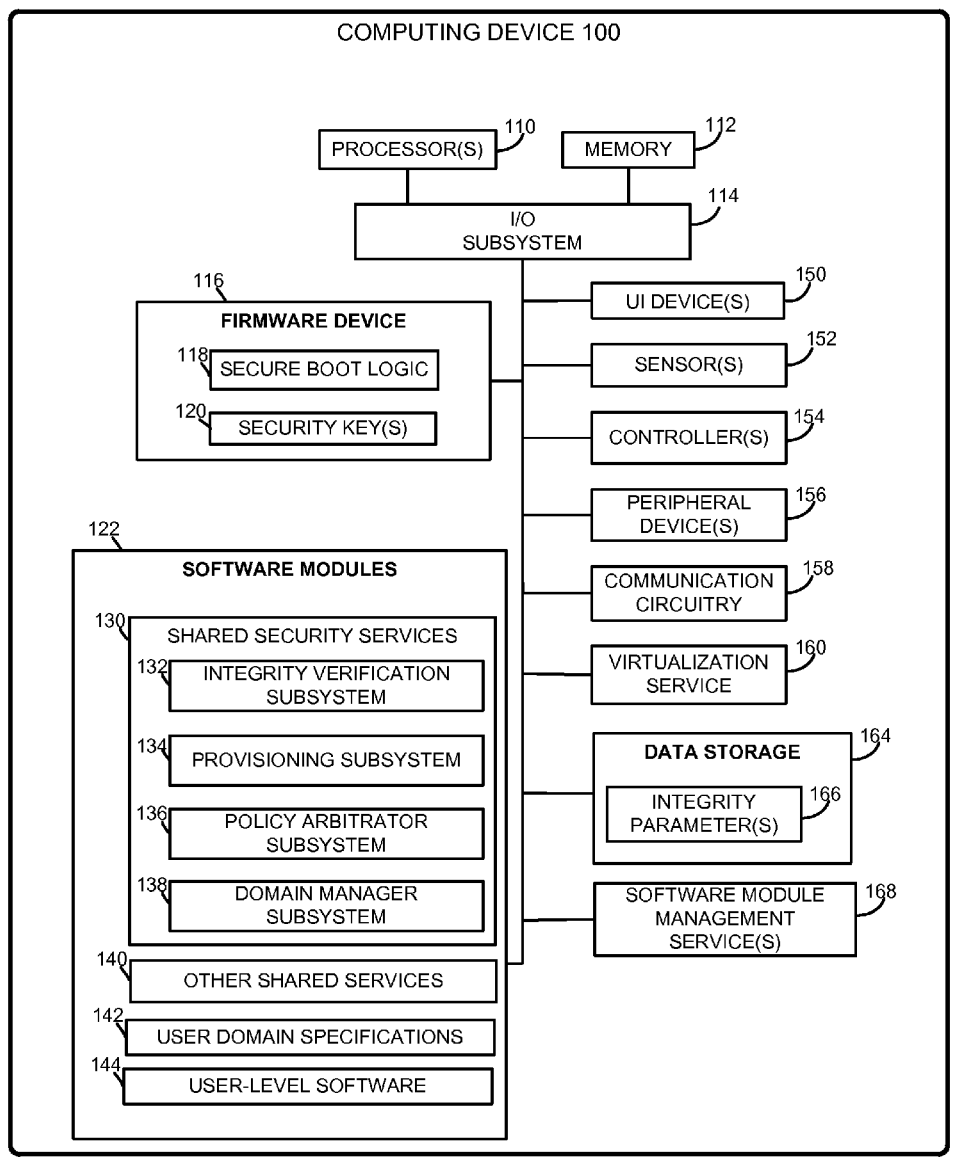
FIG. 1 is a simplified block diagram of at least one embodiment of a system architecture for a virtualized mobile computing device, including an integrity verification subsystem.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

There are few, if any, integrity verification approaches that can reliably determine the integrity of operating systems, system files, libraries and other software at both at load time and at run time, as needed. Many existing techniques are either integrated with the operating system itself, or must be executed offline. As described in this disclosure, a physical or virtualized device block-based verification of firmware or software at load time or at run time can be leveraged to provide more robust and flexible integrity verification services that operate independently of the operating system.

In general, computer files can become corrupted as a result of, for example, storage media failures, transmission errors, write errors that occur during copying or moving of the files, or computer program bugs. Additionally, untrusted parties may intentionally modify computer files to insert malicious code during use, transmission or storage of the file. Accordingly, as used herein, "integrity verification" refers generally to the use of computerized algorithms, methods or procedures for determining whether the integrity and/or authenticity of a computer file (e.g., data and/or computer program instructions, software or firmware) has been corrupted or otherwise compromised.

Portions of this disclosure describe embodiments of an integrity verification subsystem that is adapted for use on a mobile computing device that has a modular, virtualized system architecture. Some embodiments of modular, virtualized mobile computing devices can be configured with multiple different user-level execution environments, each of which may be tailored for a different use or application of the mobile device. A mobile device designed with such an architecture can, among other things, address security issues that commonly arise when personal mobile devices are used for business purposes or vice versa.

To provide a high assurance of security, such "multiple-personality" computing devices may isolate the different user-level execution environments, e.g., as personal and enterprise domains, or "classified" and "unclassified" domains, so as to simultaneously protect personal privacy and enterprise security. For instance, one domain may allow the mobile device user to access personal records such as e-mail, medical data, or financial reports, while another domain may permit access to data and applications involving very highly confidential or secret business information, processes or operations. To do this, domain isolation, encryption, policy, and related security technologies developed by SRI International can be embedded into smart phones and other mobile devices, as described in more detail below and in other patent applications. Some examples of high assurance, multiple-personality mobile devices that have been developed by SRI International were mentioned in the press release, "SRI International Begins Final Development of Commercial Trusted Mobility Devices for U.S. Marine Corps," Apr. 8, 2013 (http://www.sri.com/newsroom/press-releases/sri-begins-final-development-commercial-trusted-mobility-devices), which is incorporated herein by this reference.

Referring now to FIG. 1, an illustrative integrity verification subsystem 132 is embodied as software, firmware, hardware, or a combination thereof, to perform integrity verification services during the operation of a computing device 100. The illustrative computing device 100 is embodied as a mobile computing device configured with a modular, virtualized system architecture, as described in more detail below. In some embodiments, however, the computing device 100 may be any type of computing device having a virtualized architecture, a traditional system architecture, or a traditional system architecture configured to provide some virtualization features. For example, the computing device 100 may be embodied as any type of personal computer (e.g., desktop, laptop, net book, e-reader, tablet, smart phone, body-mounted device, or mobile appliance), a server, an enterprise computer system, a network of computers, a combination of computers and other electronic devices, or other types of electronic device, including wearable medical monitoring and sensing devices, commercial personal devices, health monitoring devices, embedded scientific and sensing devices, UAV's (unmanned aerial vehicles), SUAV's (small unmanned air vehicles), other types of unmanned vehicles, and other safety critical systems.

Thus, while not specifically shown, it should be understood that portions of the integrity verification subsystem 132 can reside on other computing devices or computing systems, in some embodiments. For example, a portion of the integrity verification subsystem may be local to the computing device 100, while another portion may be distributed across one or more other computing systems or devices that are in communication with the computing device 100 by one or more electronic communication networks, via communication circuitry 158, for example. In other embodiments, the integrity verification subsystem 132 may be located entirely on the computing device 100.

The illustrative computing device 100 includes at least one central processing unit or processor 110 (e.g., a microprocessor, microcontroller, digital signal processor, etc.), memory 112, and an input/output (I/O) subsystem 114. The processor 110 and the I/O subsystem 114 are communicatively coupled to the memory 112. The memory 112 may be embodied as any type of suitable computer memory device (e.g., volatile memory such as various forms of random access memory).

The I/O subsystem 114 may include, among other things, an I/O controller, a memory controller, and one or more I/O ports. In some embodiments, the I/O subsystem 114 may form a portion of a system-on-a-chip (SoC) and be incorporated, along with the processor 110 and other components of the computing device 100, on a single integrated circuit chip. As such, each or any of the components coupled to the I/O subsystem 114 may be located on a common integrated circuit chip, in some embodiments.

The illustrative I/O subsystem 114 is communicatively coupled to a number of hardware, firmware, and software components, including a firmware device 116, a number of software modules 122, a number of user interface devices 150 (e.g., a touchscreen, keyboard, virtual keypad, microphone, etc.), one or more sensors 152 (e.g., optical sensors, motion sensors, location sensors, and the like), controllers 154 (e.g., memory controllers, I/O controllers, network interface controllers, graphics controllers, etc.), other peripheral devices 156 (e.g., modems, data storage interfaces, displays, speakers, and other output devices), the communication circuitry 158, a virtualization service 160, one or more data storage devices 164, and one or more software module management services 168.

The illustrative firmware device 116 is embodied as a persistent storage device such as a non-volatile or read-only memory device (e.g., NAND or NOR flash memory). In the illustrative embodiments, the firmware device 116 stores secure boot logic 118. The secure boot logic 118 includes the set of computer routines commonly known as, for example, the bootloader, Unified Extensible Firmware Interface (UEFI), or Basic Input/Output System (BIOS). The secure boot logic 118 enables the computing device 100 to start its operation once electrical power to the device is switched on, or to restart its operation in response to a user command. In some embodiments (e.g., traditional system architectures), the secure boot logic 118 loads and starts an operating system and communicates with the various other components and devices that are coupled to the I/O subsystem 114. In the illustrative virtualized mobile device architecture, however, the secure boot logic 118 loads and starts the virtualization service 160 directly from the firmware device 116, without or prior to launching any operating systems.

In some embodiments, one or more security keys 120 used by the secure boot logic 118 and/or the integrity verification subsystem 132 may be stored in the firmware device 116. The security keys 120 may include, for example, one or more public keys used in a digital signature scheme, which may be employed to authenticate one or more integrity parameters 166. As described further below, the integrity parameters 166 may include trusted block device hashes, which may be computed at initial installation of a software module 122 by a trusted party. The integrity parameters 166 may also include current block device hashes that are computed during use of the computing device 100, e.g., at software load time. More generally, the integrity parameters 166 can include or reference information (such as hash values) that can be evaluated by the secure boot logic 118 and/or the integrity verification subsystem 132 to check the integrity of executable components of the computing device 100 at load time or at run time.

In the illustrative modular, virtualized system architecture depicted by FIG. 1, the software modules 122 include shared, modular security services 130 and other shared, modular services 140 that, together with the virtualization service 160, form a trusted computing base (TCB). The shared security services 130 illustratively include the integrity verification subsystem 132, a provisioning subsystem 134, a policy arbitrator subsystem 136, and a domain manager subsystem 138. The shared security services 130 are described in more detail below with reference to FIG. 2. The other shared services 140 include system-level services, such as device drivers, which are, in more traditional system architectures, typically provided by the operating system kernel. As used herein, "shared service" may refer to a firmware or software-based computer program module that allows operating systems and other user-level software applications to interface with the hardware resources of the computing device 100, which may include the processor(s) 110, memory 112, I/O subsystem 114, and/or the devices and components that are coupled to the I/O subsystem 114.

In the illustrative modular, virtualized system architecture, the shared services 140 are virtualized at the module level, so that in a given virtualized execution environment of the computing device 100, the shared services 140 each map to a corresponding system service. For example, some of the shared services 140 may be embodied as virtual device drivers that each map to a physical device driver for a different hardware component of the computing device 100. By modularizing and isolating the shared services 140 independently of any operating system, access to the hardware resources of the computing device 100 can be monitored, controlled and restricted at the module level. In general, the software modules 122 are illustrated as such for discussion purposes, and such illustration is not intended to imply that any specific implementation details are required. For example, any of the modules 122 may be combined or divided into submodules, subprocesses, or other units of computer code or data as may be required by a particular design or implementation of the computing device 100.

In FIG. 1, the user domain specifications 142 represent run-time specifications for individual, specially partitioned user-level execution environments ("user domains") that can be executed by the virtualization service 160 during operation of the computing device 100. The user domain specifications 142 for each domain specify user-level software 144 that is permitted to execute in the domain. The user-level software 144 includes, for example, an operating system and one or more user-level software applications. Thus, with respect to the user domain specifications 142, the term "software modules 122" may refer to the user-level software 144 that is associated with a user domain specification 142 rather than the specification itself. Each user domain specification 142 may define a different "personality" of the computing device 100, as may be needed or desired, depending on the particular design, purpose, or usage context of the computing device 100.

The illustrative virtualization service 160 is embodied as a "thin" hypervisor (e.g., a microvisor), which is launched by the secure boot logic 118 directly from the firmware 116 rather than by an operating system. As used herein, "thin microvisor" refers to a type of hypervisor that is designed to be as "small" as possible, in the sense that only the core functions that are needed to establish virtualization on the computing device 100 are included in the microvisor. For example, in the illustrative embodiment, the shared services 130, 140 are not built into the microvisor but operate at a level of abstraction above the microvisor (e.g., as "middleware"). In some embodiments, however, the virtualization service 160 may include a more traditional hypervisor, virtual machine manager (VMM), or similar virtualization platform. In some embodiments, the virtualization service 160 may be embodied as a "bare metal" hypervisor, which can execute directly from the system hardware (e.g., by a processor 110 rather than the secure boot logic 118 or an operating system).

In general, the virtualization service 160 is embodied as a privileged software component that facilitates and manages the virtualization of the physical hardware resources of the computing device 100. In some embodiments, portions of the virtualization service 160 may be firmware-based rather than software-based. The virtualization service 160 allows the user-level domains defined by the user domain specifications 142 to execute concurrently or serially on the computing device 100 in isolated, virtualized execution environments.

As mentioned above, in the illustrative embodiments, the virtualization service 160 is launched directly by the secure boot logic 118 rather than by an operating system. In other embodiments (e.g., traditional system architectures), the virtualization service 160 may be launched by an operating system or by system hardware (e.g., a processor 110). In any case, the virtualization service 160 executes in a higher-privileged system or "root" mode of the computing device 100, as opposed to a lesser-privileged or "user" mode. As such, in operation, the virtualization service 160 may have substantially full control of the hardware resources of the computing device 100. Further, the other components of the trusted computing base (e.g., the shared security services 130 and the other shared services 140) may, when called upon by the virtualization service 160, also have substantially full control of one or more of the hardware resources of the computing device 100 with which they are designed to communicate. That is, due to their modularity, the shared services 130, 140 may each be capable of controlling only a specific hardware resource or a specific feature of a hardware resource of the computing device 100, in some embodiments. Such modularized control of the system hardware resources by the trusted computing base 130, 140, 160 may be aided by well-defined communication channels, as described herein.

Figure 3:
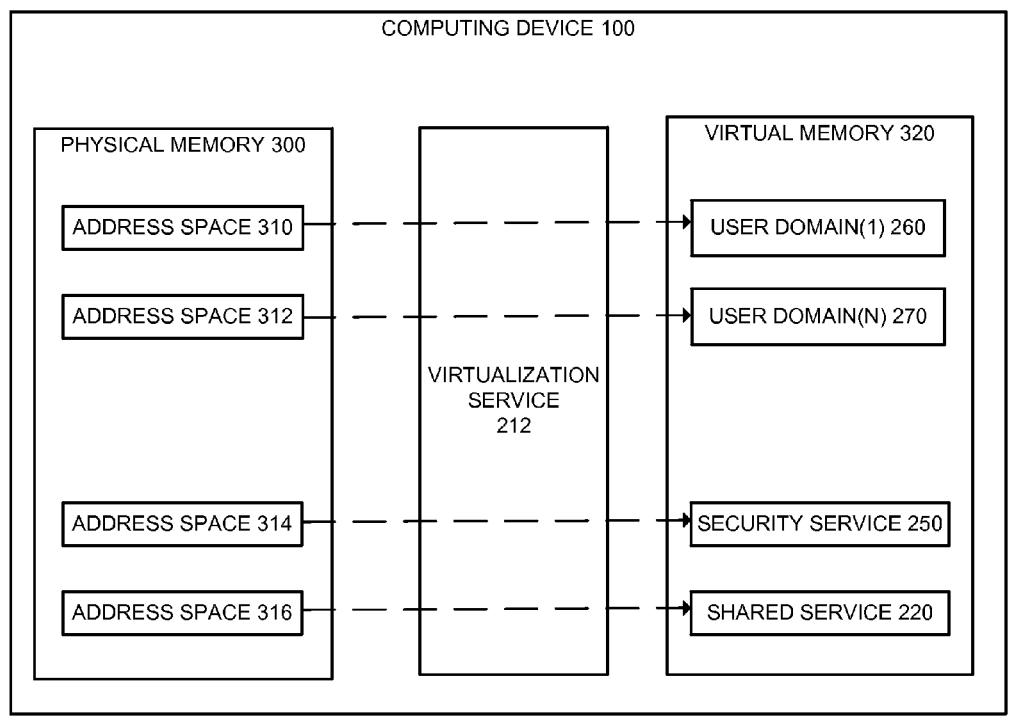
FIG. 3 is a simplified block diagram of a portion of the virtualized execution environment of FIG. 2, illustrating at least one embodiment of a data isolation scheme for the system architecture of FIG. 1.
Figure 4:
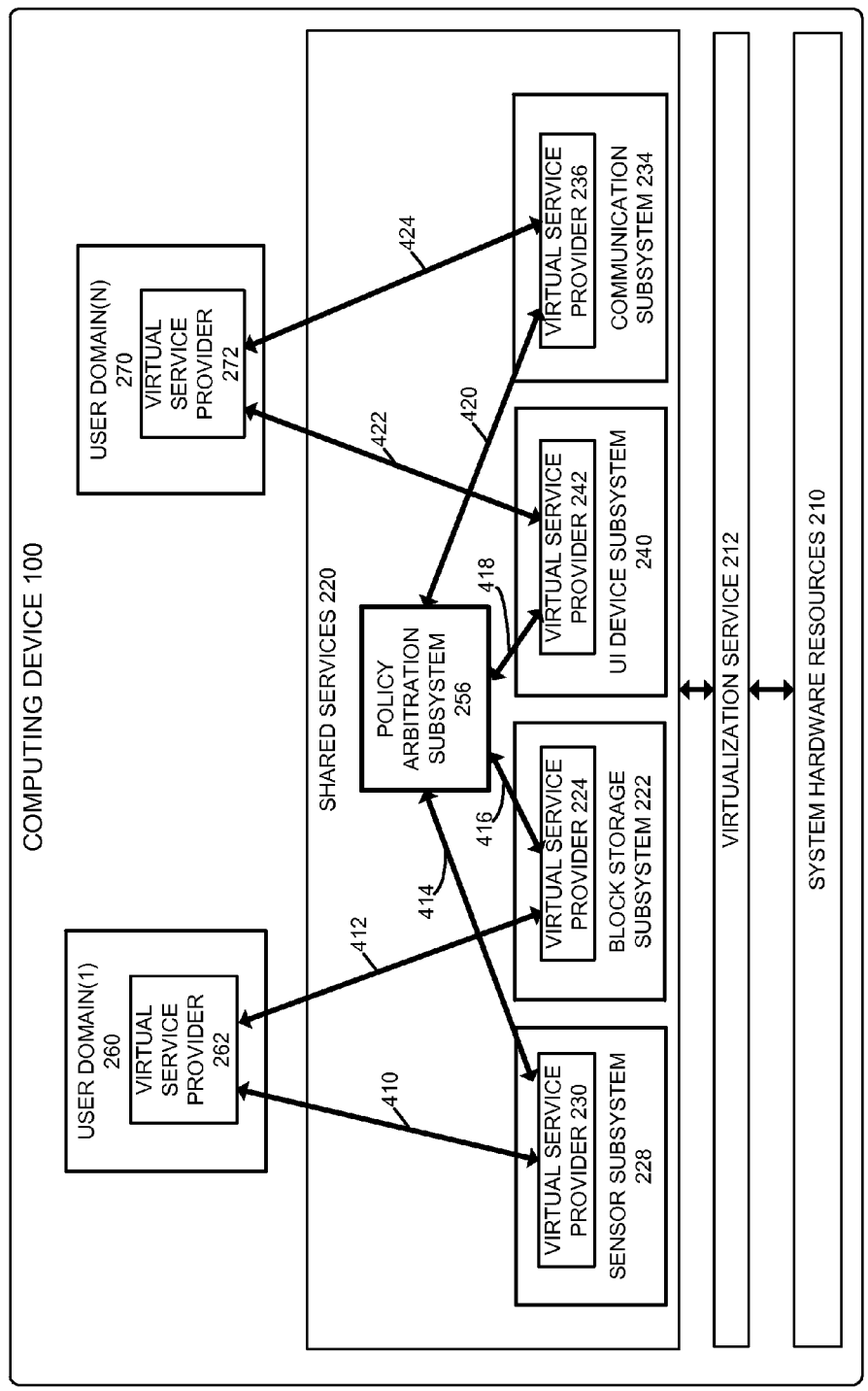
FIG. 4 is a simplified module diagram of a portion of the virtualized execution environment of FIG. 2, illustrating at least one embodiment of a process isolation scheme for the system architecture of FIG. 1.

The illustrative virtualized system architecture is partitioned in the sense that at run-time, each of the running instances of the user-level domains defined by the user domain specifications 142, as well as the components of the trusted computing base 130, 140, 160, are both memory-isolated and process-isolated from one another. To do this, as illustrated by FIG. 3, at installation time, the shared services 220, shared security services 250, user domains 260, 270, and the virtualization service 212 are each allocated and assigned to their own address space in physical memory (e.g., block storage). Further, as illustrated by FIG. 4 and described below, only well-defined (e.g., static firmware-enforced or physical hardware restrictions) communication channels exist between the modules 122 and the virtualization service 212, so that module communications can be tightly controlled according to the requirements of the current configuration of the computing device 100. As such, in some embodiments, the modular, virtualized architecture described herein represents an application of certain aspects of the MILS (multiple independent levels of security) architecture described in, for example, John M. Rushby et al., "The MILS Component Integration Approach to Secure Information Sharing," presented at the 27th IEEE/AIAA Digital Avionics Systems Conference (DASC), St. Paul Minn., October 2008, incorporated herein by this reference.

The illustrative data storage 164 is embodied as persistent physical storage, e.g. as a block device, which can read and write data in blocks having a fixed or nominal size (e.g., 512 bytes or a multiple thereof). As such, the data storage 164 may include one or more hard drives, optical drives (e.g., CD- or DVD-ROM), compact flash memory (e.g., memory sticks or memory cards), and/or other such devices.

In some embodiments, the integrity parameters 166 used by the secure boot logic 118 and/or the integrity verification subsystem 132 are stored, at least temporarily, in the data storage 164. In some embodiments, portions of the security keys 120, the virtualization service 160 and/or the software modules 122 may reside at least temporarily in the data storage 164, as well. Portions of the security keys 120, any of the software modules 122, the virtualization service 160, and/or the integrity parameters 166 may be copied to the memory 112 during operation of the computing device 100, for faster processing or other reasons.

As noted above, the communication circuitry 158 may communicatively couple the computing device 100 to other computing devices and/or systems by, for example, a cellular network, a local area network, wide area network, personal cloud, virtual personal network (VPN), enterprise cloud, public cloud, and/or public network such as the Internet. For instance, the integrity verification subsystem 252 may be used in the context of 'cloud' virtualized services, in some embodiments. The communication circuitry 158 may, alternatively or in addition, enable shorter-range wireless communications between the computing device 100 and other computing devices, using, for example, Near Field Communication (NFC) technology. Accordingly, the communication circuitry 158 may include one or more wired and/or wireless network interface cards, adapters, or other devices, as may be needed pursuant to the specifications and/or design of the particular computing system 100. The computing device 100 may include other components, sub-components, and devices not illustrated in FIG. 1 for clarity of the description. In general, the components of the computing device 100 are communicatively coupled as shown in FIG. 1 by electronic signal paths, which may be embodied as any type of wired or wireless signal paths capable of facilitating communication between the respective devices and components.

The software module management service(s) 168 may include, for example, third-party mobile device management services or similar services that may be in communication with the computing device 100 over a network or a variety of different types of networks and communication media, via the communication circuitry 158. Such services 168 may be used to, for example, develop, manage, and implement security policies for the computing device 100, such as enterprise security policies or mobile device BYOD (bring your own device) policies.

Figure 2:
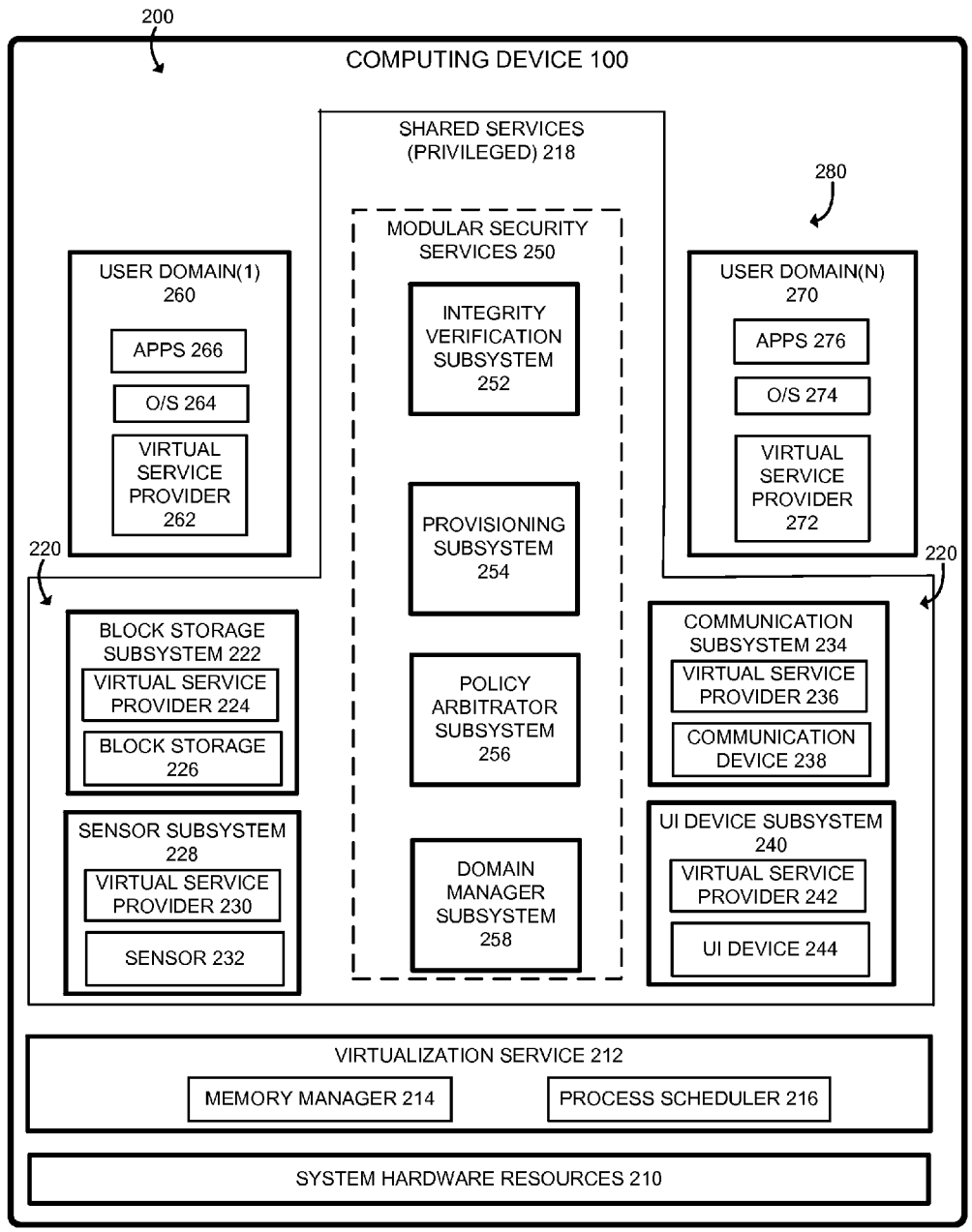
FIG. 2 is a simplified module diagram of at least one embodiment of a virtualized execution environment of the mobile device of FIG. 1.

Referring now to FIG. 2, an embodiment of a modular, virtualized execution environment 200 that may be established on the computing device 100 is shown. At run-time, an executing instance of the virtualization service 212 interfaces with the system hardware 210 (e.g., processor(s) 110, memory 112, I/O subsystem 114, and/or devices 116, 150, 152, 154, 156, 158, 164) through one or more submodules or subprocesses referred to herein as a memory manager 214 and a process scheduler 216 (which are also part of the trusted computing base). The memory manager 214 allocates virtual memory to each of the executing instances of the user domains 260, 270 and shared services 218 that corresponds to their respective assigned physical memory, so as to implement and maintain the memory isolation technology described herein. The instances of the user domains 260, 270 and shared services 218 may be referred to herein as "partitions" 280. The process scheduler 216 schedules and regulates communications between the partitions 280 and the virtualization service 212 over the well-defined communication channels described herein, so as to implement and maintain the process isolation technology described herein. Using these technologies, the virtualization service 212 in conjunction with the shared services 218 controls the use and sharing of the various hardware resources 210 by the user domains 260, 270, according to the security requirements of the computing device 100. The trusted computing base 212, 218 can mediate software module communications so that the hardware resources 210 may each be accessed and used by only one of the user domains 260, 270 at any given time. For instance, if the user of the computing device 100 is operating in an "enterprise" domain and the user is a lawyer recording a deposition or a police officer videotaping a crime scene, the trusted computing base 212, 218 can ensure that, while the enterprise domain is using the device's camera, the camera cannot be accessed by the user's "personal" domain or any software modules that may be running in the personal domain that could allow digital image files to be transferred off of the device 100 (e.g., email or text messaging programs).

At run-time, the virtualization service 212 communicates with virtual service provider software modules 230, 242, 262, 272 that are embedded in the shared services 220 and the domains 260, 270, respectively. A virtual service provider 230, 242, 262, 272 translates and maps the virtualized operations of its respective domain 260, 270 or shared service 220 to its physical counterparts. Together, the virtualization service 212 and the modularized virtual service providers 230, 242, 262, 272 provide a level of abstraction between the partitions 280 (e.g., each of the domains 260, 270 and the shared services 218) and the system hardware 210. In other words, the virtualization service 212 and virtual service providers 230, 242, 262, 272 provide hardware abstractions of some or all of the system hardware resources 210, for each of the domains 260, 270 and the shared services 218. As shown by FIG. 4, the policy arbitration subsystem 256 may, alone or in conjunction with other modular security services 250, oversee the communications between the virtual service providers 230, 242, 262, 272 and the virtualization service 212.

In the example execution environment of FIG. 2, the trusted computing base, which operates in the privileged mode of the computing device 100, includes the executing instance of the virtualization service 212 and the executing instances of the shared services 218. The shared services 218 can be thought of as middleware that interfaces with the virtualization service 212 to control and manage the execution of the various user domains 260, 270. The shared services 218 include the executing instances of the shared security services 250 and the other shared services 220.

In the illustration of FIG. 2, the other shared services 220 include executing instances of a block storage subsystem 222, a sensor subsystem 228, a communication subsystem 234, and a user interface device subsystem 240. Other system services, such as audit services and encryption services, may be similarly modularized and virtualized. The illustrative shared services 218 are both memory-isolated and process-isolated from the user domains (which, as illustrated, include at least a user domain(1) 260 and a user domain(N) 270). Additionally, the user domains 260, 270 are both memory-isolated and process-isolated from each other and from the executing instances of the components 212, 218 of the trusted computing base. As such, the illustrative user domains 260, 270 are independently controllable by the trusted computing base 212, 218 or more specifically, by the virtualization service 212 interacting with the share security services 250 and with the other shared services 220. While only two user domains are shown in the illustration, the computing device 100 may support any number ("N") of user domains 260, 270 according to the requirements of a particular design.

The illustrative security services 250 operate independently but in conjunction with one another and with the other shared services 220 and the virtualization service 212, to provide security features for the various domains 260, 270 running on the computing device 100. As described in more detail with reference to FIGS. 5 and 6, the integrity verification subsystem 252 may be called upon by the virtualization service 212 to check the integrity of a software or firmware module on the computing device 100 at load time or at run time, and/or in response to a triggering event.

The illustrative provisioning subsystem 254 represents an executing instance of the provisioning subsystem 134, which defines the software configuration applicable to each of the individual user domains 260, 270. For example, if the user domain specifications 142 for the user domain 260 indicate that the user domain 260 is to be configured as a special type of domain having certain security restrictions, the provisioning subsystem 134 may specify, and in operation (254), regulate: the particular types of software modules 122 that are permitted to be loaded in the domain 260; which services, modules or processes have ownership privileges to replace or update the software modules in the domain; how those modules are to be loaded (e.g., their memory address space); and whether and how those modules can perform memory accesses (e.g., other address spaces that the modules are permitted to access). As an example, in some embodiments, the integrity verification subsystem 252 may interface with the provisioning subsystem 254 in order to obtain the block addresses that it needs to perform integrity checks.

The integrity parameters 166 may need to be updated when subsystems, user domains, applications, or user data/content update (e.g., write data to) persistent storage. For example, new hash values may need to be generated or provided by the new or updated module when a module is upgraded. In most modern operating systems, user data storage is separated from the operating system kernel, operating system services, applications, and application dynamic content/cache. On personal computers (e.g., Windows, Mac OSX, or Linux distributions, where the operating system user space and the user applications and data are typically located on the same partition), the separation often occurs within a single file system. In mobile device environments, the data segregation is typically finer-grained. For example, in ANDROID systems, separate partitions are typically provided for the operating system kernel/boot logic, operating system OEM applications, user applications and user-generated or downloaded data/content. A virtualized environment may further partition the persistent storage to even finer granularity, to allow for the integration of additional services (e.g., the integrity verification subsystem 252).

In either type of environment (personal computer or mobile device), the provisioning subsystem 254 may trigger the integrity verification subsystem 252 in response to a module or file update. To account for the possibility that modules or data files may be modified or updated in a benign way, as may occur if the computing device user changes a font file, for example, the integrity verification subsystem 252 may cooperate with the provisioning subsystem 254 so as to automatically generate a hash of the module or file that is stored in, e.g., a cloud-mirrored file system.

In some embodiments, the provisioning subsystem 254 may provide mechanisms to update the integrity subsystem configuration and/or the system behavior in response to an integrity result. This may be desirable when, for example, upgrades to a domain, module, user application, or user content occur. In such events, if hash values are used as the integrity parameters, the hashes will change with the updates, thereby necessitating a corresponding update to the trusted integrity parameters. The integrity parameters (which may contain hashes, digital signatures, or a combination thereof, for example), can be used to ensure that firmware, software, and data have not been altered since creation, upgrade or installation. In some cases, the integrity parameters can be used in combination with a public key infrastructure or PKI (e.g., a technique for authenticating an authorized party's data), in order to verify and authenticate signed domains, modules (e.g., typical firmware components) and third party applications (e.g., ANDROID application packages or APKs) during a creation, upgrade or installation event.

The illustrative policy arbitrator subsystem 256 represents an executing instance of the policy arbitrator subsystem 136, which defines the protocols for, and in operation (256), regulates the scheduling intervals for electronic communications across the well-defined communication channels between the user domains 260, 270 and the virtualization service 212. The policy arbitrator subsystem 256 mediates these communications in accordance with security policies that may be applicable to the respective user domains 260, 270 or that are set globally to apply across all of the domains 260, 270 on the computing device 100. For example, the policy arbitrator subsystem 256 may enforce information flow controls to prevent data from a highly secure domain from "leaking" over into another less-secure domain (e.g., to prevent private or confidential data from being sent off of the computing device 100 through e-mail or other services).

As another example, the policy arbitrator subsystem 256 may restrict access to specific user domains 260, 270 by particular hardware components. In particular, access by a user domain 260, 270 to device drivers that control hardware components that are capable of capturing personal or confidential information (like the camera and microphone) may be restricted. In other words, the policy arbitrator subsystem 256 may not only prevent data from leaking from highly secure to less secure domains, but can also effectively control access to specific hardware resources based on a security policy or "real-time" information such as the current geographic location of the computing device 100, the current time of day, and/or other aspects of the current context of the computing device 100 that may be detected, for example, by sensors 152. For instance, the policy arbitrator subsystem 136 may enforce an access policy that governs the transfer of data/content from one domain 260, 270 to another domain 260, 270 based on the time of day, location, or a current context captured as a state of the computing device 100.

In addition, the policy arbitrator subsystem 136, which arbitrates communication channels, may provide for the downgrading or filtering of information on such channels to different user domains. As an example, where the computing device 100 captures Global Positioning System or GPS location data, the policy arbitrator subsystem 136 may permit the computing device 100 to send highly accurate location values to a security-vetted application in the domains 260, 270, but only permit the computing device 100 to send rough approximations of geographic location to un-vetted third party application in domains 260, 270 (where applications may be required by the policy arbitrator subsystem 136 or some other security service 130 to undergo a vetting process before the applications can be included in a domain 260, 270).

The illustrative domain manager subsystem 258 represents an executing instance of the domain manager subsystem 138, which defines rules and specifications for, and in operation (258) controls and manages, the execution of the user domains 260, 270 globally, e.g., at the computing device level. That is, whereas the provisioning subsystem 254 oversees the configuration of software modules (e.g., operating system and applications software) within each of the individual domains 260, 270, the domain manager subsystem 258 determines which domain(s) 260, 270 should be permitted to execute at any given point in time, and which virtual software services/subsystems a user domain 260, 270 can use concurrently or exclusively with other user domains 260, 270. Virtualized software services may be provided by any virtual service provider 224, 230, 236, 242 to which the domain manager subsystem 258 can control access, such as local software or hardware services (e.g., encryption services, network access, touchscreen display, audio input or output, etc.). The domain manager subsystem 258 can switch operation of the computing device 100 from a highly sensitive domain (e.g., an enterprise domain) to a less-sensitive domain (e.g., a personal/social use domain), or vice versa, in response to a triggering event. Such a triggering event may include, for example, the receipt of user input such as a specific software command or a user name and password. The detection of certain inputs from one or more of the sensors 152 may also act as a triggering event. For example, if the computing device 100 detects, based on sensor data, that the user has entered a highly secure geographic area (such as a corporate office or a research facility), the domain manager subsystem 258 may autonomously (e.g., without requiring any user input) disable the user's access to any less-secure domains and only permit the user to access a highly secure domain on the computing device 100.

The other shared services 220 communicate with the virtualization service 212 through a respective virtual service provider 224, 230, 236, 242 to provide their respective hardware abstractions in a modular way. For instance, the block storage subsystem 222 virtualizes the I/O communications with block storage devices 226 (such as the firmware 116 or data storage 164). The block storage subsystem 22 thereby acts as a virtual device driver service that can be called upon by other modules of the trusted computing base or by the user domains 260, 270, through the virtualization service 212, to move data out of block storage and into random access memory or vice versa. As an example, the integrity verification subsystem 252 may, through the virtualization service 212, communicate with the block storage subsystem 222 to obtain one or more of the integrity parameters 166. In this case, only the block storage subsystem 222 may need system permission to read the computer file that is the subject of the integrity verification (in order to generate the hash value or other integrity parameter 166). As a result, in some embodiments, the integrity verification subsystem 252 need only access the hash values generated by the block storage subsystem 222 and need not obtain permission to read the actual block of data or perform the hash. Isolating functionality that requires data read or write accesses in selected modules in this way can further reduce or at least contain the risk of security breaches.

The sensor subsystem 228, the communication subsystem 234 and the user interface device subsystem 240 operate similarly, in that they provide access to their respective hardware resources 232, 238, 244 through modularized abstractions (e.g., virtual drivers). For example, the domain manager subsystem 258 may obtain sensor data from the sensor subsystem 228 through its interface with the virtualization service 212 and the virtual service provider 230. As another example, the integrity verification subsystem 252 may send integrity data (e.g., an indication of whether a particular software module 122/280 passed or failed an integrity check) to a mobile device management system by interfacing with the virtualization service 212 and the virtual service provider 236. Through this modularization of the system architecture and the isolation techniques described herein, security issues can be confined to the partitions 280 and/or hardware resources 210 that may be affected.

In the illustrative execution environment 200, the user domains 260, 270 execute as "guests" of the virtualization service 212. That is, the user domains 260, 270 execute in a lower-privileged, non-privileged, or non-root mode. As a result, the user domains 260, 270 are lesser-privileged execution environments than that provided by the higher-privileged virtualization service 212. The operating systems 264, 274 and software applications 266, 276 executing in each of the user domains 260, 270 may be the same or different. For instance, in some embodiments, the domain 260 may execute the ANDROID operating system while the domain 270 may execute the IOS operating system, or the domains 260, 270 may execute different versions of the same operating system. As another example, the domain 260 may execute an e-mail program and a web browser, while the domain 270 may execute an electronic medical records system but not e-mail or web browser applications.

Referring now to FIG. 3, an embodiment of the memory isolation features of the illustrative modular, virtualized architecture of the computing device 100 is shown. The computing device 100 includes physical memory 300 (e.g., persistent storage such as various forms of the data storage 164) which is abstracted to virtual memory 320 by the virtualization service 160. The physical memory 300 includes a number of physical address spaces 310, 312, 314, 316. Each of the address spaces 310, 312, 314, 316 constitutes a separate and non-overlapping portion of the physical memory 300. Thus, when the physical memory resources are virtualized by the virtualization service 212 (in conjunction with a modular shared service 220, in some embodiments), the partitions 280 are each mapped to separate, isolated portions of the physical memory 300. The assignment of physical memory address spaces to partitions 280 (e.g., shared services 220, security services 250, user domains 260, 270) and the assignment of security labels to memory addresses may be performed at the time that the computing device 100 is created and provisioned (e.g., by an original equipment manufacturer or OEM), for example. In some embodiments, unique security labels may be associated with each of the memory addresses to facilitate the security features provided by the security services 250. For example, the policy arbitration subsystem 256 may use such security labels to determine whether to permit a user domain 260, 270 to perform a read or write memory access to a portion of the physical memory 300.

Referring now to FIG. 4, an embodiment of the process isolation or "information flow" isolation features of the illustrative modular, virtualized system architecture of the computing device 100 is shown. The bidirectional arrows 410, 412, 414, 416, 418, 420, 422, 424, 426, 428 each represent a well-defined communication channel that may be unidirectional for some domains 260, 270 or shared services 218 and bidirectional for other domains 260, 270 or shared services 218, depending upon the applicable security policy. As used herein, "well-defined" refers to a communication link (e.g., any suitable type of wired or wireless signal path) that only has two possible endpoints (e.g., a source and destination or vice versa) and cannot be modified by any user domains 260, 270 or shared services 220. For instance, in some embodiments, hardware restrictions may be provided by a computing device's original hardware design (e.g., an I2C bus layout or intra-bus connects within an SoC). In the context of software virtualization of a communication bus, a privileged controller (e.g., a microvisor supervising single-service access to an approved hardware resource) can restrict access to a communication channel by different "users" (e.g., user domains 260, services 218), rather than designing the device hardware to include additional buses for each special purpose channel (e.g., 1x physical bus per virtualized service). In other words, the well-defined communication channels may be embodied as, for example, micro-visor supervised secure multiplexed communications over a single bus/physical transport or as multiple independent buses that each ensure singleton security.

Thus, in the embodiment of FIG. 4, each of the user domains 260, 270 can only access the hardware resources 210 through the defined communication channels 410, 412, 414, 416, 418, 420, 422, 424, 426, 428 and can only do so through the virtualization service 212 and shared services 218. Unique security labels may be associated with each of the well-defined communication channels so that the components of the trusted computing base can monitor communications that are sent between the different partitions 280 (e.g., domains 260, 270 and shared services 218) of the computing device 100. For instance, the policy arbitration subsystem 256 can mediate the communications that occur over the channels 410, 412, 414, 416, 418, 420, 422, 424, 426, 428 according to global device-level security policies and/or domain-specific security policies, in accordance with the requirements of the computing device 100. The assignment of communication channels to partitions 280 and the assignment of security labels to communication channels may be performed at the time that the computing device 100 is designed and/or provisioned (e.g., by an original equipment manufacturer or OEM). For example, the communication channels may be established when the memory partitions for the user domains 260, 270 and shared services 218 are created.

Figure 5:
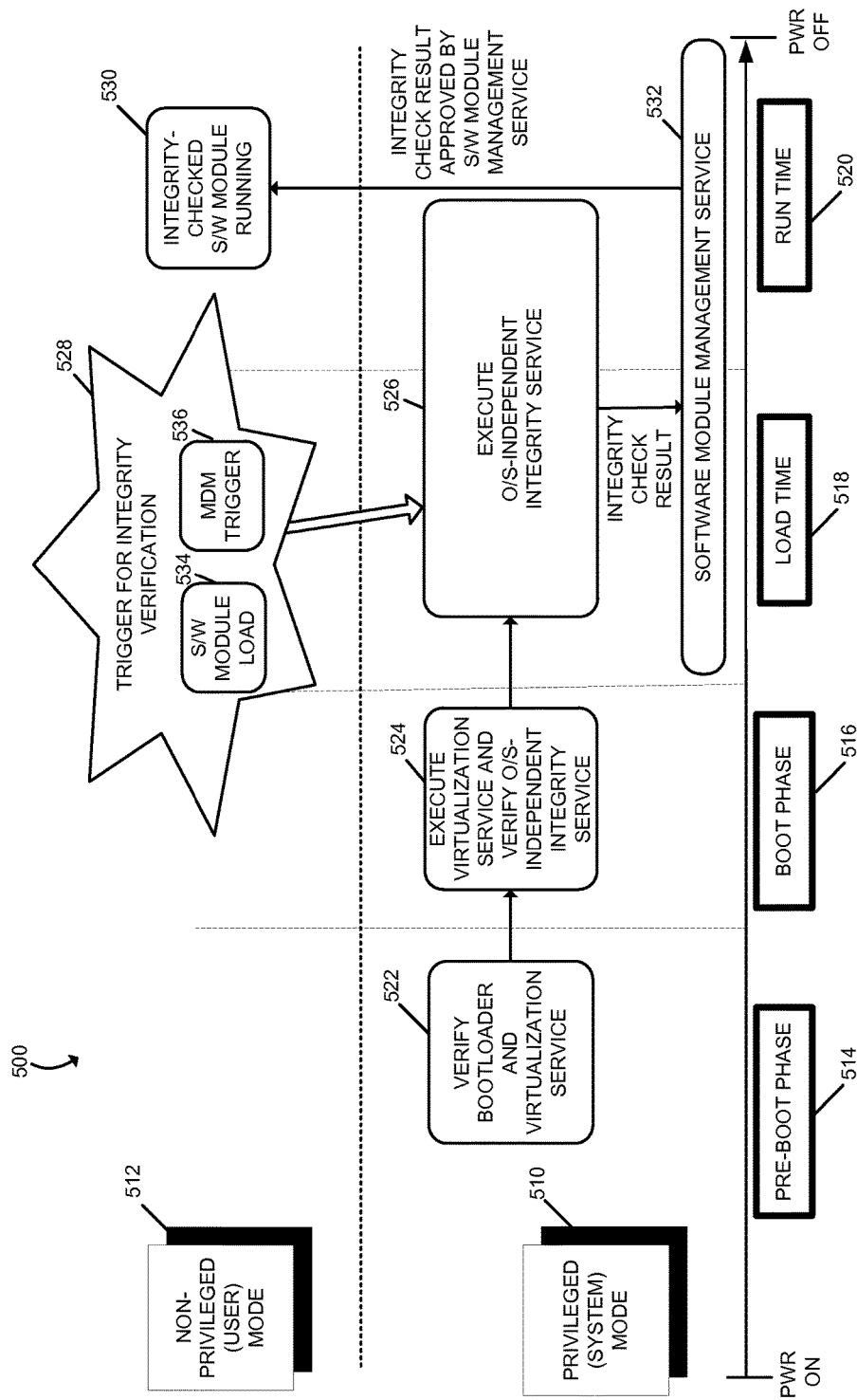
FIG. 5 is a simplified flow diagram of at least one embodiment of a process for launching the integrity verification subsystem of FIG. 1.

Referring now to FIG. 5, an embodiment of an integrity verification process 500 for the computing device 100 is shown. As discussed above, embodiments of the computing device 100 have a privileged or system mode 510 and a non-privileged or user mode 512. At least the secure boot logic 118 executes in the privileged mode 510. In the illustrative embodiments, the virtualization service 212 and the shared services 218 also execute in the privileged mode, while the user domains 260, 270 execute in the non-privileged mode 512. Illustratively, the operation of the computing device 100 is divided into phases: a pre-boot phase 514, a boot phase 516, a load time phase 518, and a run time phase 520.

The pre-boot phase 514 occurs just after the computing device 100 is powered on, and is executed by the processor 110. The integrity of the secure boot logic 118 (which may be embodied as a chain of "bootloaders," where each bootloader stage verifies a subsequent link) is verified during the pre-boot phase 514, as shown by step 522. To do this, the processor 110 may use a security key 120 to verify a digital signature of the next stage boot image. For example, a public key stored in SoC ROM may used to verify the digital signature of a subsequent boot image, where the digital signature has been previously generated by the corresponding private key). As used herein, "boot image" refers generally to a computer file that contains the system components that are needed in order for the processor 110 to boot the computing device 100. For example, the secure boot logic 118 and/or portions of the virtualization service 160 and shared services 130, 140 may be part of the boot image, in some embodiments.

The boot image may be created and written to the firmware device 116 at the time that the computing device 100 is made or provisioned (e.g., by an OEM). The security key 120 may be a public key of a digital signature scheme that is also written into the firmware device 116 by the manufacturer of the SoC or the computing device 100, or another certifying authority. As used herein, "digital signature" refers to a mathematical scheme that can be used to demonstrate the authenticity of a computer file. In general, a signing algorithm is used to create the digital signature based on the computer file and a private security key (which should be kept secret by the certifying authority). A verifying algorithm can then be used to verify the digital signature based on the digital signature and a public key. Some examples of digital signature schemes include the RSA (Rivest-Shamir-Adleman) algorithm and hash trees (tree data structures in which each non-leaf node is labeled with the hash of the labels of its child nodes).

A hash of the boot image, rather than the boot image, itself, may be used as input to the signing algorithm, to create the digital signature. For example, the OEM or other certifying authority may generate a hash tree of the known, good boot image (where each "leaf" of the hash tree includes a hash of a block of the boot image), and then digitally sign the hash tree. Any suitable hash algorithm, including cryptographic hash functions like SHA-1, MD5, SHA-* (e.g., SHA-256 and SHA-512), or other secure hash algorithms, may be used to generate the hash tree for the boot image.

The digitally signed hash tree can be used to verify that the boot image was created by a known party, and that the boot image has not been altered since its original creation. The processor 110 can thus verify the authenticity of the secure boot logic 118 using the public key 120 and the verifying algorithm of the digital signature scheme. The processor 110 can verify the integrity of the secure boot logic 118 by comparing the hash of the secure boot logic 118 (or one or more blocks thereof) to the corresponding value(s) in the hash tree. Any difference between the known good version of the boot image and the current version of the boot image will cause the corresponding hash values to differ, and will thus cause the comparison to fail. If the integrity of the secure boot logic 118 is confirmed, the processor 110 executes the secure boot logic 118.

The secure boot logic 118 verifies the integrity of the virtualization service 160 in a similar way. That is, the secure boot logic 118 compares a hash value generated from one or more blocks of the virtualization service 160 to the corresponding hash value in the hash tree of the verified boot image. If the secure boot logic 118 is able to successfully verify the integrity of the virtualization service 160, the secure boot logic 118 starts up the virtualization service 160, thereby initiating the boot phase 516 of the computing device 100. If the integrity check of either the secure boot logic 118 or the virtualization service 160 fails, the computing device 100 will not boot successfully.

Once verified and booted, the executing instance 212 of the virtualization service 160 performs an integrity check of the integrity verification subsystem 132 in a similar way, at step 524. That is, the virtualization service 160 hashes or obtains a hash value for one or more blocks of the integrity verification subsystem 132 and compares the current hash values to the trusted hash values stored in the corresponding leafs of the hash tree of the verified boot image. Alternatively or in addition, a modular service such as the block storage subsystem 222 may compute the current hash values of one or more blocks of the integrity verification service 132 as the blocks are loaded from persistent storage into memory 112, and provide the current hash values to the integrity verification subsystem 132.

If the integrity check of the integrity verification subsystem 132 fails, the virtualization service 160 may respond in accordance with the applicable security policy. For example, the virtualization service 160 may display a message on a user interface device 150 (e.g., a display) of the computing device 100 to inform the user that the integrity check failed and ask if the user wishes to continue booting the computing device 100. As another example, the virtualization service 160 may continue booting the device 100 but allow only certain domains 260, 270 or portions thereof to boot (e.g., domains or applications executable therein that are not considered essential to the security of the computing device 100).

If the integrity check of the integrity verification service 132 is successful, the integrity verification service 132 may be launched by the virtualization service 160. Depending on the applicable security policy for the device 100 and/or the domains 260, 270, the integrity verification service 132 may perform an integrity check each time a software module is loaded into memory, or may perform integrity checks only for certain software modules or types of software modules, or may perform integrity checks in response to certain triggering events 528, either during load-time or run-time of a software module. For instance, the loading of a software module from persistent storage into memory 112 may act as a triggering event (step 534), in some cases. In some embodiments, a message received by the virtualization service 160 from a mobile device management service or other software module management service (step 536) may trigger an integrity check. For example, the computing device 100 may receive a mobile device management command from a mobile device management service and initiate an integrity check in response to such command. During run-time, certain system-level commands executed by the software module may trigger an integrity check. As an example, if a software module attempts to send data off of the mobile computing device or access a suspicious web site, such activity may trigger an integrity check.

The integrity verification service 132 performs the integrity checks in a similar manner as described above and in more detail below with reference to FIG. 6. The integrity verification service 132 may report the results of its integrity checks to, for example, one or more of the software module management services 168 (step 532). Such services 168 may include, for example, third-party mobile device management services and/or similar services. In some embodiments, software module management services 168 may be embodied as portions of the virtualization service 160 and/or other services of the trusted computing base of the computing device 100. In any case, a software module management service 168 may determine how to respond to the results of the integrity check and provide instructions to the virtualization service 160 or the integrity verification subsystem 132, accordingly. In other embodiments, the integrity verification service 132 itself may contain such logic. For instance, either the integrity verification service 132 or the software module management service 168 may initiate the execution of an integrity-checked software module (step 530), if the integrity check is successful or in some cases, even if the integrity check is not successful. For example, depending upon the applicable security policy, some software modules may be approved for execution even if their integrity check is unsuccessful. If it is determined (e.g., by the integrity verification service 132 or the software module management service 168) that the integrity check failed and the software module should not be executed, the integrity verification service 132 may (in conjunction with the user interface device subsystem 240, in some embodiments) inform the user by presenting a message on a user interface device 150, fail to complete the load of the software module, or take some other action consistent with the applicable security policy.

Figure 6:
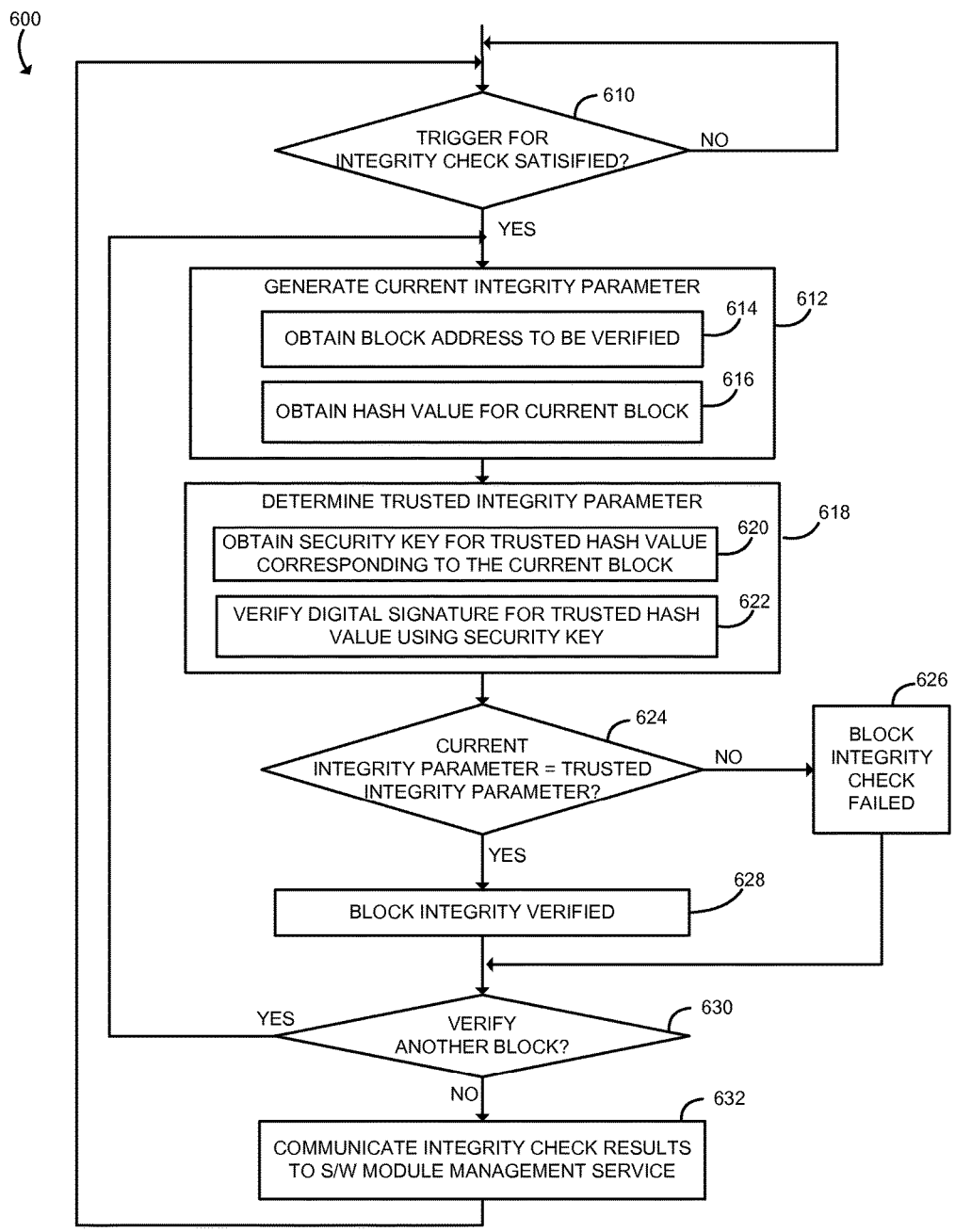
FIG. 6 is a simplified flow diagram of at least one embodiment of a method for integrity verification.

Referring now to FIG. 6, an illustrative method 600 for verifying the integrity of a software module is shown. The method 600 may be embodied as computerized programs, routines, logic and/or instructions, which may be executed by the computing device 100, e.g., by the integrity verification subsystem 132. At step 610, the method 600 monitors the execution environments of the computing device 100 (e.g., the domains 260, 270) for an event in response to which integrity verification is to be initiated. As discussed above, the triggering event may include, for example, the loading of a software module or a specific type of software module into random access memory for execution, the receipt of a message or command from a software module management service 168, or another type of triggering event. In this way, fine-granularity integrity verification can be provided. That is, the method 600 can be selectively executed by the virtualization service 160 or the integrity verification subsystem 132. For example, in some embodiments, the method 600 may be executed only for selected security-critical software components of the computing device 100, or only for certain software components of a particular domain 260, 270.

If the computing device 100 detects a triggering event, the method 600 generates a current integrity parameter at step 612. The current integrity parameter is generated or derived from the software module that is the subject of the integrity check. For instance, the current integrity parameter may include a hash value that is computed by applying a hash algorithm to one or more blocks of the software module to be verified. To do this, the block(s) of the software module are used as input to a hash function, and the resulting hash value(s) are used as the current integrity parameter. The hash function may be any of the cryptographic hash algorithms mentioned above, or another type of hash function. In more detail, at step 614, a block address of a portion of the software module stored in a block device is obtained from, e.g., the virtualization service 212 or the block storage subsystem 222. At step 616, the method 600 obtains the hash value that corresponds to the block address obtained at step 614. In some embodiments, the method 600 may simply obtain the hash value from the block storage subsystem 222. The obtained hash value may be calculated when requested by the integrity verification subsystem 254 (e.g., "on the fly"), or calculated opportunistically and cached when the block is read from persistent storage. Further, highly optimized hardware that provides persistent block storage may calculate and store hashes so that negligible computational overhead is incurred. In other embodiments, the method 600 may read the portion of the software module stored at the block address into memory and compute the hash value at that time.

At step 618, the method 600 determines the trusted integrity parameter that corresponds to the same block of the software module as is used to determine the current integrity parameter at step 612. If the software module being integrity-checked is part of the boot image, the trusted integrity parameter may be determined from the hash tree of the boot image, which is trusted due to its earlier integrity verification, as described above with reference to step 522 of FIG. 5. In some embodiments, the trusted integrity parameter may be a digitally signed hash value that is created by the developer of the software module or another trusted party. In that case, the signed hash value may be appended to the software file during transmission or download. The method 600 may verify the digital signature associated with the hash value using, for example, a public key provided to the computing device 100 at some earlier time by the software developer or another trusted party, such as a mobile device manager service 168. It should be appreciated from the foregoing discussion that the modular system architecture of the computing device 100 allows different portions of the boot image to be signed by different trusted parties during the provisioning of the computing device 100. Thus, the security key 120 may include a number of different security keys corresponding to the number of trusted parties providing components for the provisioning of the computing device 100.

At step 624, the method 600 compares the current integrity parameter to the trusted integrity parameter to determine whether the current version of the software module, which is the subject of the current integrity check, is the same as the trusted version of the same software module, from which the trusted integrity parameter was generated. Of course, this comparison assumes that the same hash algorithm is used to both create the trusted integrity parameter in the first place and to compute the current integrity parameter at a later time. In some embodiments, the integrity parameters may be stored as binary hashes and compared for differences. In other embodiments, the integrity parameters may be stored as ASCII encoded strings and a conventional string comparison function may be used. If the method 600 determines that the integrity parameters do not match, the method may conclude that the integrity check failed at step 626 and proceed to step 630. If the method 600 determines that the integrity parameters match, the method 600 may conclude, at step 628, that the integrity check was successful and proceed to step 630.

At step 630, the method 600 determines whether to verify another block of the current version of the software module that is the subject of the integrity check. To do this, the method 600 may consult an applicable security policy and/or consider the software module type. For instance, the method 600 may perform integrity checks on multiple blocks of software modules that are considered important to the security of the computing device but only perform an integrity check on one or a small number of blocks for software modules that are considered less security-critical or less of a security risk. If the method 600 determines that an integrity check should be performed on another block of the software module being verified, the method 600 returns to step 612. In some embodiments, where multiple blocks are integrity checked, the hash values for the multiple blocks may be computed serially or in parallel and compared individually or as a set. Further, where multiple blocks are integrity-checked and not all of the blocks pass the integrity check, the method 600 may determine whether the software module passed or failed the integrity check based on an applicable security policy or set of security rules. At step 632, the method 600 communicates the integrity check results to the requesting process, e.g., a software module management service 168, and returns to step 610.

Example Usage Scenarios

Embodiments of the above-described integrity verification techniques can provide operating system independence and component-specific, event-driven or "on demand" integrity verification that has many potential applications. For example, some embodiments of the integrity verification service 132 can be used by mobile device management services and other third parties for auditing purposes, particular since they may do so without requiring direct software read access. Additionally, using the foregoing approaches, security-critical software modules may be periodically integrity checked to, for example, detect sideloading or run-time compromise attacks. Some examples of such security-critical modules include, for example, software and firmware modules embedded in or installed on medical monitoring and sensing devices, health monitoring devices, unmanned vehicles and other remotely-controlled devices to control the operation of such devices, data acquisition by the devices, and/or other functions. Further, software modules may be periodically checked to determine whether a software upgrade or other modification is needed.

As another example, some versions of the integrity verification subsystem 132 can be utilized by software application developers, or application providers, to check the integrity of their applications as a prerequisite or pre-condition to their distribution. For instance, application providers may require an integrity check prior to the release of digital media content or before enabling additional licensed features (e.g., prior to releasing content governed by digital rights management (DRM) or other sensitive content, or prior to unlocking advanced application capabilities or features). In some cases, applications providers may wish to bundle content, additional plug-ins, capabilities, features, or third-party content licenses with a version of the integrity verification subsystem 132. A third party license agreement may restrict the usage of the content or features based on the agreement terms of use, and the integrity verification subsystem 132 may be used to enforce the contractual restrictions.

To further demonstrate this potential, consider a media content provider application that provides streaming of multiple levels of inexpensive, standard and premium content (some of which may be advertisement-subsidized, subject to basic retransmission/licensing, or subject to per-user view fees). The content provider may restrict the availability of certain features (e.g., high definition) unless various integrity assurances can be provided. As an example, an application may permit multiple different levels of content streaming that are conditioned upon the successful completion of integrity checks initiated by the integrity verification subsystem 132. Some content may not be subject to any restrictions, but other content (e.g., premium or subscription-based content) may be only permitted to be streamed onto certain types of secure devices that have been updated with the latest patched software. In addition, the content provider may desire to audit the full software stack of the computing device on demand, if unusual streaming behavior is detected. Aspects of the integrity verification subsystem 132 may be used for these and other purposes. For example, application providers may wish to bundle the integrity verification service 132 with their application as a means to ensure that the application is operating in compliance with the applicable terms of service and within the terms of third party licensing agreements.

The illustrative integrity verification subsystem 132, which operates outside of the control of the operating system or other service that is being inspected (to provide independent remote attestation), is by no means limited to benefitting only mobile applications. Embodiments of the subsystem 132 can be integrated into virtualized personal computer or server farm operating systems (e.g., cloud-based computing services). The integrity verification subsystem 132 can be used to detect when a node (e.g., a website host in a server farm/cloud) is compromised in a manner that alters content (e.g., by the injection of malware).

In a similar manner, any digital content, perhaps in the form of software/firmware upgrades and security patches, audio video media, etc., can be published and verified in a distributed cloud environment. In other words, versions of the integrity verification subsystem 132 can be integrated with distributed and virtualized services, such as cloud networks. In such a scenario, the integrity subsystem 132 may publish the existing and/or recently-generated integrity parameters to a cloud-based integrity service. The cloud-based integrity service (or more simply put, an authorized software agent or computer program) may perform integrity checks on content continually, e.g., wherever and whenever the content is replicated in the cloud. The integrity verification subsystem 132 may be configured to receive notifications from the integrity service whenever specific types of content are created by the user (e.g., taking a picture, recording notes, etc.), or when a file download occurs, for example. The integrity verification subsystem 132 may then generate or record the integrity parameters associated with the content (i.e., integrity parameters generated at content creation, or when the content is "shared"). If the integrity parameters are generated at the creation of the content, the integrity verification service 132 may check to make sure that the content did not change between the time of creation and the share event. Further, when a user shares a piece of content, the integrity verification subsystem 132 may be notified (e.g., by the content-sharing service), and in response to the notification, the integrity verification subsystem 132 may send the integrity parameters to an audit subsystem or relay the integrity parameters directly to interested consumers (e.g., a cloud-based content integrity parameter database that a cloud integrity subsystem uses to check the content stored on its cloud nodes).

An audit subsystem may publish specific integrity check results (e.g., TWEETS or RETWEETS) to a particular subscriber of the audit service. For instance, in a messaging system like TWITTER, an integrity check may be triggered in response to a TWEET or RETWEET of content, and the result of the integrity check may be published to a cloud-based integrity service that is designed to ensure that all nodes are replicating content without modifications. The cloud-based integrity subsystem may, alternatively or in addition, periodically verify that content is replicated consistently across all nodes of the cloud service.

Additionally, some versions of the integrity verification service 132 may be used by everyday consumers to check the integrity of their own content and provide virtually irrefutable attestation of the content's author/originator and the content's integrity as it is replicated across a distributed network. As an example, a user of a social media application may take a picture or post a document and then select 'share' on the content. Such content is often shared seamlessly with social or enterprise networks (such as FACEBOOK, TWITTER, and GOOGLE+, as well as company intranets and community court records, for example). While users typically need to enter a user name and password to use these applications, the sites can be hacked and thus, it can be difficult to determine whether the content share was actually performed by the user or by a hacker. In these cases, the integrity verification subsystem 132 may cooperate with an auditing subsystem to more or less simultaneously 'share' the content ID and integrity parameters (e.g., hashes) with a cloud-based audit network to create an independent integrity attestation of the content and its originator.

A user may also "lease" content to commercial content providers (such as search engines and social networks), and the integrity verification service 132 may be used in this context, as well. For instance, if a user posts a video file to a social network, the user may use the integrity verification service 132 to periodically check the integrity of the video file. If the integrity check fails, the user may revoke the lease or take some other action to protect the user from misrepresentation and liabilities if their content is altered. In some form, this could allow for the remote attestation/verification of published content (advertisements, TWEETS, etc.) across a decentralized and distributed hosting network.

Additional Examples

According to at least one aspect of this disclosure, an operating system-independent integrity verification subsystem for a computing device is embodied in one or more machine-accessible storage media. The integrity verification subsystem is configured to verify the integrity of a current version of a software module on the computing device by, in response to a load-time or run-time event triggering integrity verification of the current version of the software module: computing, in an execution environment that exists independently of any operating systems running on the computing device, a current hash value for a block of the current version of the software module as the block is loaded from a persistent storage into volatile memory on the computing device, where the block includes a portion of the current version of the software module stored in the persistent storage. The integrity verification subsystem is also configured to access a trusted hash value, where the trusted hash value is computed from a block of a trusted version of the software module that corresponds to the block of the current version of the software module; compare the current hash value to the trusted hash value; and evaluate the integrity of the current version of the software module based on the comparison of the current hash value to the trusted hash value.

The integrity verification subsystem may compute the current hash value by executing a secure hash algorithm on the block of the current version of the software module. The integrity verification subsystem may verify the trusted hash value by verifying a digital signature associated with the trusted hash value. The integrity verification subsystem may obtain a security key from a data storage location that is accessible by the execution environment but not accessible by any operating systems on the computing device, and use the security key to verify the digital signature. The integrity verification may, in response to determining that the integrity evaluation is successful, execute the current version of the software module. The integrity verification subsystem may, in response to determining that the integrity evaluation is not successful, determine whether to execute the current version of the software module based on a security policy associated with the computing device. The integrity verification subsystem may send data relating to the integrity evaluation to a software module management service. The integrity verification subsystem may initiate execution of the current version of the software module in response to approval of the integrity evaluation by the software module management service. The computing device may be a virtualized mobile computing device, where the execution environment is created by a virtualization service on the mobile computing device, and the integrity verification subsystem is configured to communicate with the virtualization service to determine whether the event triggering integrity verification of the current version of the software module has occurred.

According to at least one aspect of this disclosure, a method for verifying the integrity of a current version of a software module on a virtualized mobile computing device independently of any operating systems on the mobile computing device includes, with the mobile computing device: with a virtualization service running on the mobile computing device, detecting a load-time or run-time event triggering an integrity check of the current version of the software module; in response to the load-time or run-time triggering event, comparing a current integrity parameter associated with the current version of the software module to a trusted integrity parameter associated with a trusted version of the software module, the current integrity parameter being derived from a block of the current version of the software module, the block comprising a portion of the current version of the software module stored in a data storage, the trusted integrity parameter being derived from the trusted version of the software module, the trusted integrity parameter being accessible by the virtualization service on the mobile computing device but not accessible by any operating systems on the mobile computing device; and evaluating the integrity of the current version of the software module based on the comparison of the current integrity parameter to the trusted integrity parameter.

The method may include performing integrity verification on the virtualization service during a pre-load phase of the operation of the mobile computing device. The method may include obtaining the trusted integrity parameter through communication with the integrity-verified virtualization service. The method may include obtaining the current integrity parameter through communication with the integrity-verified virtualization service. The method may include accessing a security key on the mobile computing device and using the security key to verify the trusted integrity parameter. The method may include verifying the trusted integrity parameter by verifying a digital signature associated with the trusted integrity parameter using the security key. The software module may include an operating system and the method may include, in response to determining that the integrity evaluation is successful, loading the current version of the operating system. The method may include, in response to the integrity evaluation, communicating with a mobile device management service to determine whether to execute the current version of the software module.

According to at least one aspect of this disclosure, a mobile computing device includes a processor; and machine accessible storage media having embodied therein an operating system-independent virtualization service and an integrity verification subsystem executable by the virtualization service, the integrity verification subsystem configured to, in an automated fashion, selectively perform block-based hash verification to verify the integrity of a plurality of different software modules on the mobile computing device either at load time or in response to a run-time triggering event.

The integrity verification subsystem may be configured to selectively perform block-based hash verification to verify the integrity of a plurality of different operating systems on the mobile computing device, at load time, in response to loading of the operating systems from persistent storage into volatile memory on the mobile computing device. The integrity verification subsystem may be configured to verify the integrity of one or more of the operating systems in response to a communication from a mobile device management system.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. An operating system-independent integrity verification subsystem for a computing device, embodied in one or more non-transitory machine-accessible storage media, the integrity verification subsystem configured to verify the integrity of a current version of a software module on the computing device by, in response to a load-time or a run-time event triggering integrity verification of the current version of the software module, in an execution environment that exists independently of any operating systems running on the computing device:

communicating with a block storage subsystem of the computing device, the block storage subsystem embodied in one or more machine accessible storage media, the block storage subsystem having read access to persistent storage, the integrity verification subsystem not having read access to the persistent storage, the block storage subsystem computing, in an execution environment that exists independently of any operating systems running on the computing device, a current hash value for a block of the current version of the software module as the block is loaded from the persistent storage into volatile memory on the computing device, the block comprising a portion of the current version of the software module stored in the persistent storage, the block storage subsystem accessing a trusted hash value, the trusted hash value being computed from a block of a trusted version of the software module that corresponds to the block of the current version of the software module;

obtaining the current hash value and the trusted hash value from the block storage subsystem;

comparing the current hash value to the trusted hash value; and evaluating the integrity of the current version of the software module based on the comparison of the current hash value to the trusted hash value.

2. The integrity verification subsystem of claim 1, configured to obtain the current hash value as a result of the block storage subsystem executing a secure hash algorithm on the block of the current version of the software module.

3. The integrity verification subsystem of claim 2, configured to verify the trusted hash value by verifying a digital signature associated with the trusted hash value.

4. The integrity verification subsystem of claim 3, configured to obtain a security key from a data storage location that is accessible by the execution environment but not accessible by any operating systems on the computing device, and use the security key to verify the digital signature.

5. The integrity verification subsystem of claim 1, configured to, in response to determining that the integrity evaluation is successful, execute the current version of the software module.

6. The integrity verification subsystem of claim 1, configured to, in response to determining that the integrity evaluation is not successful, determine whether to execute the current version of the software module based on a security policy associated with the computing device.

7. The integrity verification subsystem of claim 1, configured to send data relating to the integrity evaluation to a software module management service.

8. The integrity verification subsystem of claim 7, configured to initiate execution of the current version of the software module in response to approval of the integrity evaluation by the software module management service.

9. The integrity verification subsystem of claim 1, wherein the computing device is a virtualized mobile computing device, the execution environment is created by a virtualization service on the mobile computing device, and the integrity verification subsystem is configured to communicate with the virtualization service to determine whether the event triggering integrity verification of the current version of the software module has occurred.

10. A method for verifying the integrity of a current version of a software module on a virtualized mobile computing device independently of any operating systems on the mobile computing device, the method comprising, with an integrity verification subsystem of the mobile computing device:

with a virtualization service running on the mobile computing device, detecting a load-time or run-time event triggering an integrity check of the current version of the software module;

communicating with a block storage subsystem of the computing device, the block storage subsystem embodied in one or more machine accessible storage media, the block storage subsystem having read access to data storage, the integrity verification subsystem not having read access to the data storage;

in response to the load-time or run-time triggering event, obtaining a current integrity value from the block storage subsystem;

comparing the current integrity parameter associated with the current version of the software module to a trusted integrity parameter associated with a trusted version of the software module, the current integrity parameter being derived by the block storage subsystem from a block of the current version of the software module, the block comprising a portion of the current version of the software module stored in the data storage, the trusted integrity parameter being derived by the block storage subsystem from the trusted version of the software module, the data storage comprising the trusted integrity parameter being accessible by the block storage subsystem but not accessible by any operating systems on the mobile computing device or by the integrity verification subsystem; and evaluating the integrity of the current version of the software module based on the comparison of the current integrity parameter to the trusted integrity parameter.

11. The method of claim 10, comprising, during a pre-load phase of the operation of the mobile computing device, performing integrity verification on the virtualization service.

12. The method of claim 11, comprising obtaining the trusted integrity parameter through communication with the integrity-verified virtualization service.

13. The method of claim 12, comprising obtaining the current integrity parameter through communication with the integrity-verified virtualization service.

14. The method of claim 10, comprising accessing a security key on the mobile computing device and using the security key to verify the trusted integrity parameter.

15. The method of claim 11, comprising verifying the trusted integrity parameter by verifying a digital signature associated with the trusted integrity parameter using the security key.

16. The method of claim 10, wherein the software module is an operating system and the method comprises, in response to determining that the integrity evaluation is successful, loading the current version of the operating system.

17. The method of claim 10, comprising, in response to the integrity evaluation, communicating with a mobile device management service to determine whether to execute the current version of the software module.

18. A mobile computing device, comprising: a processor; and non-transitory machine accessible storage media having embodied therein an operating system-independent virtualization service, a block storage subsystem communicatively coupled to the virtualization service, and an integrity verification subsystem communicatively coupled to the virtualization service, the integrity verification subsystem configured to, in an automated fashion, selectively communicate with the block storage subsystem to perform block-based hash verification to verify the integrity of a plurality of different software modules on the mobile computing device either at load time or in response to a run-time triggering event the block storage subsystem having read access to persistent storage, the integrity verification subsystem not having read access to the persistent storage.

19. The mobile computing device of claim 18, wherein the integrity verification subsystem is configured to selectively perform block-based hash verification to verify the integrity of a plurality of different operating systems on the mobile computing device, at load time, in response to loading of the operating systems from persistent storage into volatile memory on the mobile computing device.

20. The mobile computing device of claim 18, wherein the integrity verification subsystem is configured to verify the integrity of one or more of the operating systems in response to a communication from a mobile device management system.

* * * * *